(12) United States Patent
Li et al.

(10) Patent No.: US 7,380,345 B2
(45) Date of Patent: Jun. 3, 2008

(54) PORTABLE DIGITAL HORIZONTAL INCLINOMETER

(75) Inventors: Guangjin Li, GuiLin (CN); Jian Shi, GuiLin (CN)

(73) Assignee: Guilin Gemred Sensor Technology Ltd., Guilin (CN)

( * ) Notice: Subject to any disclaimer, the term of this patent is extended or adjusted under 35 U.S.C. 154(b) by 152 days.

(21) Appl. No.: 11/463,599

(22) Filed: Aug. 10, 2006

(65) Prior Publication Data
US 2007/0051000 A1 Mar. 8, 2007

(30) Foreign Application Priority Data
Sep. 3, 2005 (CN) .................. 2005 2 0035400 U

(51) Int. Cl.
G01C 9/12 (2006.01)
G01C 9/06 (2006.01)
(52) U.S. Cl. .................. 33/345; 33/366.24; 33/366.11
(58) Field of Classification Search ............ 33/366.24, 33/344, 345, 366.11, 366.25, 366.26
See application file for complete search history.

(56) References Cited

U.S. PATENT DOCUMENTS

| 2,362,616 | A | * | 11/1944 | Cloud | 33/333 |
| 2,577,875 | A | * | 12/1951 | Cloud | 33/333 |
| 2,802,279 | A | * | 8/1957 | Agins | 33/326 |
| 2,933,821 | A | * | 4/1960 | D'Enis | 33/345 |
| 4,700,479 | A | * | 10/1987 | Saito et al. | 33/366.24 |
| 4,720,919 | A | * | 1/1988 | Saunders | 33/265 |
| 5,778,545 | A | * | 7/1998 | Smith et al. | 33/345 |
| 6,518,751 | B1 | * | 2/2003 | Bujak | 33/366.24 |
| 2002/0144418 | A1 | * | 10/2002 | Endo et al. | 33/366.24 |
| 2005/0016005 | A1 | * | 1/2005 | Voecks | 33/344 |

* cited by examiner

*Primary Examiner*—Christopher W Fulton
(74) *Attorney, Agent, or Firm*—Matthias Scholl P.C.; Scholl, Matthias

(57) ABSTRACT

Taught herein are portable digital horizontal inclinometers which utilize magnetic field to dampen the free swing of the pendulum. The inclinometers feature simple structure, small size, high sensitivity, good linearity, high precision, and strong anti-jamming capability. They are also easy to manufacture and provide fast and accurate reading over a wide range of inclination angles of up to 360°.

18 Claims, 1 Drawing Sheet

PORTABLE DIGITAL HORIZONTAL INCLINOMETER

CROSS-REFERENCE TO RELATED APPLICATIONS

This application claims priority to the Chinese Application No. CN 200520035400.2, filed Sep. 3, 2005, the contents of which are incorporated herein by reference.

BACKGROUND OF THE INVENTION

1. Field of the Invention

This invention relates to measuring instruments, and specifically, to portable digital horizontal inclinometers.

2. Description of the Prior Art

Currently, two types of conventional pendulum inclinometers, one with a damping device and one without a damping device, are used for the measurement of inclination angles. The inclinometer without a damping device is only suitable for static measurement as it takes a long time for the stabilization of the pendulum to obtain a correct angle reading. On the other hand, the inclinometer with a damping device can provide damping of the pendulum to rapidly eliminate its free swing, and thus to realize a continuous dynamic measurement to the inclination angle.

Conventionally, silicon oil or air has been used for damping of the pendulum. However, the damping coefficient of silicon oil decreases greatly with increasing temperature which restricts significantly the operating temperatures of inclinometers utilizing silicon oil. Similarly, using air for damping is not ideal because it requires complicated designs and high machining precision.

In view of the forgoing, a Chinese Pat. App. No. CN00223002.X disclosed a digital inclinometer with magnetic damping, which offers the advantage of stable and fast reading. Unfortunately, the design disclosed therein is not functional for wide angle measurements.

SUMMARY OF THE INVENTION

In one embodiment of the present invention provided is a portable digital horizontal inclinometer with an angle measuring device comprising: a cover (10) having an outer surface and a plurality of cavities; a roller bearing (7) having a shaft with a tip and a housing, and having a first axis of rotation; a capacitive displacement sensor (3) having a movable bar and a grounding finger (4); a damping device comprising a pendulum (6) and a plurality of magnetic slices (9); and one or more ferrite beads (8); wherein the movable bar and the pendulum (6) are inflexibly attached to the shaft; the grounding finger (4) is disposed on the tip of the shaft; at least two magnetic slices (9) are inserted into the cavities in a way so that the adjacent magnetic slices (9) are oriented with the opposite polarity towards the pendulum (6).

In one class of this embodiment at least one ferrite bead (8) is inflexibly attached to at least one magnetic slice (9).

In another class of this embodiment at least one ferrite bead (8) is inflexibly attached to the outer surface.

In another class of this embodiment, the magnetic slices (9) provide a uniform magnetic circuit for the pendulum, the circuit being symmetric with respect to the first axis of rotation.

In another class of this embodiment, the cavities are about the same size as said magnetic slices (9) so as to allow said magnetic slices (9) to fit snuggly within said cavities.

In another class of this embodiment, the pendulum (6) is rotatable around said axis of rotation in a plane that is parallel to said back cover (10).

In another class of this embodiment, the portable digital horizontal inclinometer comprises further a supporting plate (2). In a class of this embodiment, at least one ferrite bead is inflexibly attached to the supporting plate (2).

In another class of this embodiment, the distance of the ferrite bead (8) inflexibly attached to said supporting plate (2) from said first axis of rotation is about the same as the distance of the ferrite bead (8) inflexibly attached to said outer surface from said first axis of rotation.

In another embodiment of the invention provided is a portable digital horizontal inclinometer with an angle measuring device comprising a supporting plate (2) having a plurality of cavities and a supporting plate surface; a cover (10) having an outer surface; a roller bearing (7) having a shaft with a tip and a housing, and having a first axis of rotation; a capacitive displacement sensor (3) having a movable bar and a grounding finger (4); a damping device comprising a pendulum (6) and a plurality of magnetic slices (9); and one or more ferrite beads (8); wherein the movable bar and the pendulum (6) are inflexibly attached to the shaft; the grounding finger (4) is disposed on the tip of the shaft; at least two of the magnetic slices (9) are inserted into the cavities in a way so that the adjacent magnetic slices (9) are oriented with the opposite polarity towards the pendulum (6).

In one class of this embodiment at least one ferrite bead (8) is inflexibly attached to at least one magnetic slice (9).

In another class of this embodiment at least one ferrite bead (8) is inflexibly attached to the supporting frame surface.

In another class of this embodiment, the magnetic slices (9) provide a uniform magnetic circuit for the pendulum, the circuit being symmetric with respect to the first axis of rotation.

In another class of this embodiment, the cavities are about the same size as the magnetic slices (9) so as to allow the magnetic slices (9) to fit snuggly within said cavities.

In another class of this embodiment, the pendulum (6) is rotatable around the first axis of rotation in a plane that is parallel to the supporting frame (2).

In another class of this embodiment, at least one ferrite bead is inflexibly attached to the outer surface.

In another class of this embodiment, the distance of the ferrite bead (8) inflexibly attached to said supporting plate (2) from said first axis of rotation is about the same as the distance of the ferrite bead (8) inflexibly attached to said outer surface from said first axis of rotation.

BRIEF DESCRIPTION OF THE DRAWINGS

Many of the attendant advantages of the present invention will become more readily apparent and better understood as the following detailed description is considered in connection with the accompanying drawings in which.

DETAILED DESCRIPTION OF THE INVENTION

Figure 1:
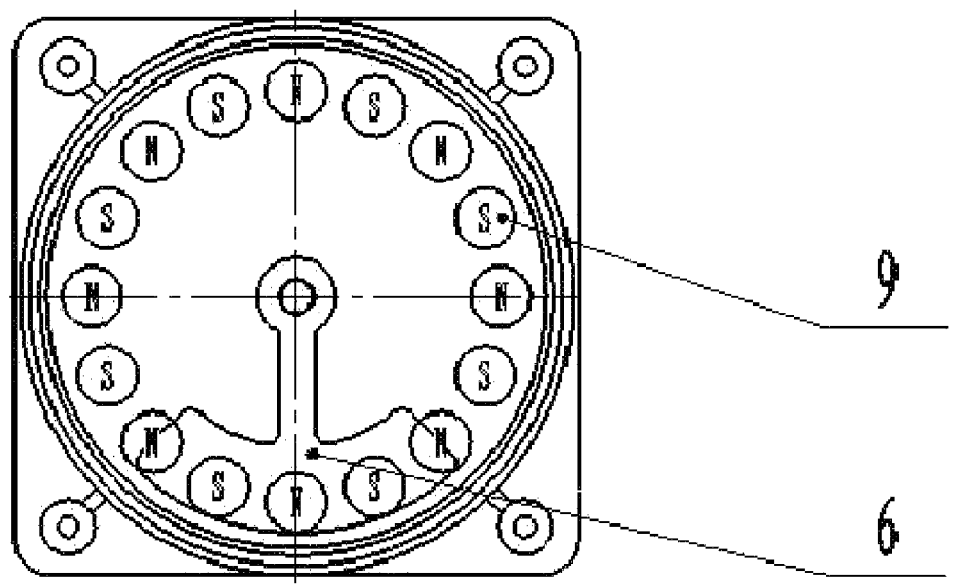
FIG. 1 is a front view of an embodiment according to the invention.

One objective of the present invention is to provide a portable digital horizontal inclinometer having not only simple structure, small size, good linearity, high precision, and strong anti-jamming capability, but also effective damping to the pendulum so as to realize fast and accurate reading over a wide range of inclination angles.

In accordance with the present invention, portable digital horizontal inclinometers are disclosed. The inclinometer having an angle measuring device comprises a base, a supporting plate, a capacitive displacement sensor, a pendulum, a shaft, a back cover, and a damping device. The damping device comprises a damping slice and at least one magnetic slice. The movable bar of capacitive displacement sensor and the pendulum are inflexibly attached to and interlocked with the shaft of the rolling bearing system. The grounding finger of the capacitive displacement sensor is settled on the pointed end of the shaft of the rolling bearing system. The cavities matching with the magnetic slices are arranged on the circular plane of the back cover paralleling with the plane of swing of the pendulum. One or more ferrite beads are bonded on the outer surface of the back cover. At least two magnetic slices are inserted into the matching holes of the said cover, with the alignment of opposite polarity for the adjacent slices. One side of the magnet slice is bonded with the ferrite bead, and the other forms air magnetic circuit with other magnetic slices. The damping slice, that is the pendulum, always operates within a magnetic air gap provided by the magnetic slices.

In order to decrease the leakage and increase the intensity of magnetic field of the magnetic gap, a ferrite bead is bonded on the surface of the supporting plate opposite the pendulum and the magnet slice, and corresponds to the ferrite bead bonded on the back cover.

The magnetic slices can also be arranged circularly on the surface of the supporting plate with the adjacent slices being aligned with opposite polarity. One side of the magnetic slice is bonded with the ferrite bead, and the other forms magnetic field with the other magnetic slices.

In one embodiment of the invention, during the measurement when the base is inclined, the pendulum swings under the influence of gravitation, which then drives the movable bar of the capacitive displacement sensor to rotate and to produce a digital signal of a magnitude corresponding to the swing angle. The value of the angle is obtained when the digital signal is processed by an integrated circuit.

While the pendulum transverses the magnetic field lines, a Foucault current is generated which produces resistance that opposes the motion of the pendulum. The amount of the Foucault current is in direct proportion to the speed of swing with the amount of resistance decreasing with a decrease in speed. Therefore, the ultimate position of the pendulum is free from the influence of resistance, but due to the existence of resistance during the swing, the pendulum can be stabilized quickly, and in this way a fast reading is realized.

In certain embodiments of the invention, a capacitive displacement sensor is adopted for the engine core of the inclinometer. A capacitive displacement sensor has the characteristics of low power consumption, high sensitivity, and easy processing of the digital signal output.

The uniform arrangement of permanent magnetic steels (magnetic slices) on the circle of the back cover causes the fan pendulum to always stay in the magnetic air gap in the range of 360°. The magnetic slices provide a uniform magnetic circuit for the pendulum, said circuit being symmetric with respect to the axis of rotation. This allows for a continuous measurement of the inclination angle in the range of 360°. In addition, the location of the grounding finger offers more stable and sensitive operation of the capacitive displacement sensor.

The portable digital horizontal inclinometer disclosed herein provides the advantages of small size, wide measuring range up to 360°, good linearity, high precision, fine damping, fast and stable reading, strong anti-jamming capability, and a large range of operating temperatures. The inclinometer in accordance with the present invention is especially suitable for applications where portability is required.

Figure 2:
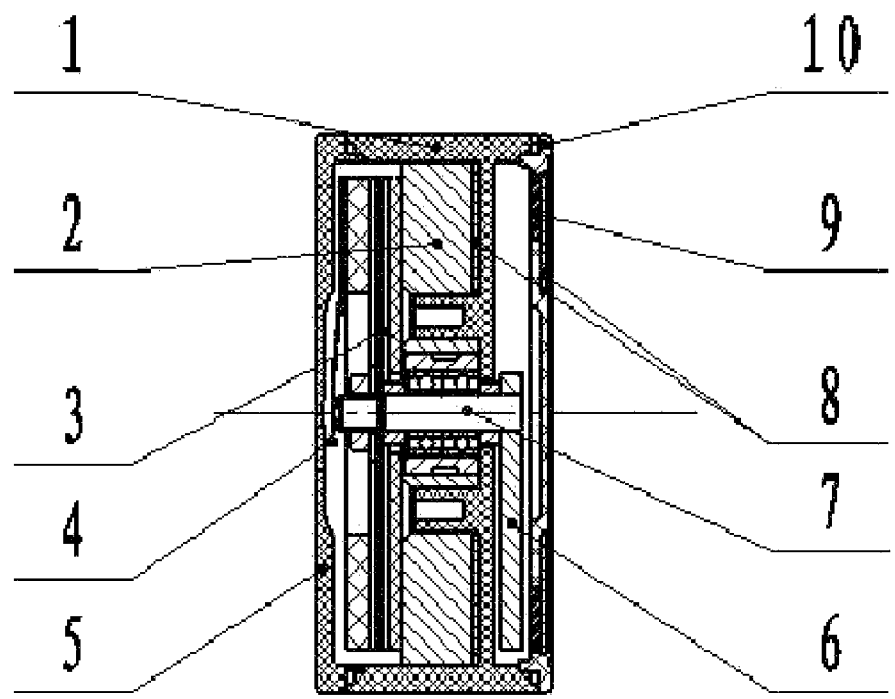
FIG. 2 is a cross-sectional view of an embodiment according to the invention.

With referenced to FIGS. 1 and 2, the inclinometer in accordance with the present invention comprises a base 1, a supporting plate 2, a capacitive displacement sensor 3, a grounding finger 4, a front cover 5, a pendulum 6, a roller bearing 7, one or more ferrite beads 8, two or more magnetic slices 9, and a back cover 10.

The pendulum 6 is made of a non-magnetic metal material. The magnetic slices 9 are made of permanent magnetic steel. The ferrite beads 8 are made of magnetic metal material. The pendulum 6 is a fan pendulum. The supporting plate 2 is inflexibly attached to the base 1. The roller bearing 7 is installed into the centre holes of the supporting plate 2. The movable bar of the capacitive displacement sensor 3 and the said fan pendulum are installed into the two cavities formed in the base 1 at the both ends of the roller bearing 7, respectively, and are interlocked with the shaft.

In certain embodiments of the present invention, the ferrite bead 8 is bonded with the back cover 10. In certain embodiments on the present invention, at least two thin (coin-like shaped) permanent magnetic steel slices are arranged circularly on the surface opposing to the fan pendulum 6, with the alignment of opposite polarity for the adjacent permanent magnetic steel slices 9. In certain embodiments of the present invention, one side of the steel slice is bonded with the ferrite bead 8, and the other side forms magnetic air gap with another steal slice. The fan pendulum 6 stays always in the magnetic air gap and is engulfed by the magnetic field lines.

In order to decrease the magnetic field leakage and increase the intensity of the magnetic field of the magnetic air gap, a ferrite bead is bonded on the surface of the supporting plate 2 opposing to the pendulum 6 and the magnet slice 9. The ferrite bead corresponds in space to the ferrite bead 8 bonded on the back cover 10; this is to say that the shortest distances from each of the two beads to the shaft are approximately the same.

The grounding finger 4 is settled on the pointed end of the shaft of the roller bearing 7, which offers more stable earthing of the movable bar of the said capacitive displacement sensor 3.

The sensor according to the present invention has the features of small staring torque and rotational resistance, and high angle resolution. For applications requiring high damping, the length, the mass, and the air gap flux of the pendulum, as well as its material property and thickness can be optimized according to the characteristic of angle variation of the inclination.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains, and are incorporated herein by reference to the same extent as if each individual publication or patent application mentioned in this specification was specifically and individually indicated to be incorporated by reference.

What is claimed is:

1. A portable digital horizontal inclinometer with an angle measuring device comprising
   a cover (10) having an outer surface and a plurality of cavities;
   a roller bearing (7) having a shaft with a tip and a housing, and having a first axis of rotation;
   a capacitive displacement sensor (3) having a movable bar and a grounding finger (4);
   a damping device comprising a pendulum (6) and a plurality of magnetic slices (9); and
   one or more ferrite beads (8);
wherein
   said movable bar and said pendulum (6) are inflexibly attached to said shaft;
   said grounding finger (4) is disposed on said tip; and
   at least two said magnetic slices (9) are inserted into said cavities in a way so that the adjacent magnetic slices (9) are oriented with the opposite polarity towards said pendulum (6).

2. The inclinometer of claim 1 wherein at least one said ferrite bead (8) is inflexibly attached to at least one said magnetic slice (9).

3. The inclinometer of claim 2 wherein at least one said ferrite bead (8) is inflexibly attached to said outer surface.

4. The inclinometer of claim 3 wherein the magnetic slices (9) provide a uniform magnetic circuit for the pendulum, said circuit being symmetric with respect to the first axis of rotation.

5. The inclinometer of claim 3 wherein said cavities are about the same size as said magnetic slices (9) so as to allow said magnetic slices (9) to fit snuggly within said cavities.

6. The inclinometer of claim 3 wherein said pendulum (6) is rotatable around said axis of rotation in a plane that is parallel to said back cover (10).

7. The inclinometer of claim 3 comprising further a supporting plate (2) wherein at least one said ferrite bead is inflexibly attached to said supporting plate (2).

8. The inclinometer of claim 7 wherein the distance of the ferrite bead (8) inflexibly attached to said supporting plate (2) from said first axis of rotation is about the same as the distance of the ferrite bead (8) inflexibly attached to said outer surface from said first axis of rotation.

9. The inclinometer of claim 1 wherein at least one said ferrite bead (8) is inflexibly attached to said outer surface.

10. A portable digital horizontal inclinometer with an angle measuring device comprising
    a supporting plate (2) having a plurality of cavities and a supporting plate surface;
    a cover (10) having an outer surface;
    a roller bearing (7) having a shaft with a tip and a housing, and having a first axis of rotation;
    a capacitive displacement sensor (3) having a movable bar and a grounding finger (4);
    a damping device comprising a pendulum (6) and a plurality of magnetic slices (9); and
    one or more ferrite beads (8);
wherein
    said movable bar and said pendulum (6) are inflexibly attached to said shaft;
    said grounding finger (4) is disposed on said tip; and
    at least two said magnetic slices (9) are inserted into said cavities in a way so that the adjacent magnetic slices (9) are oriented with the opposite polarity towards said pendulum (6).

11. The inclinometer of claim 10 wherein at least one said ferrite bead (8) is inflexibly attached to at least one said magnetic slice (9).

12. The inclinometer of claim 11 wherein at least one said ferrite bead (8) is inflexibly attached to said supporting frame surface.

13. The inclinometer of claim 12 wherein the magnetic slices (9) provide a uniform magnetic circuit for the pendulum, said circuit being symmetric with respect to the first axis of rotation.

14. The inclinometer of claim 12 wherein said cavities are about the same size as said magnetic slices (9) so as to allow said magnetic slices (9) to fit snuggly within said cavities.

15. The inclinometer of claim 12 wherein said pendulum (6) is rotatable around said axis of rotation in a plane that is parallel to said supporting frame (2).

16. The inclinometer of claim 12 wherein at least one said ferrite bead is inflexibly attached to said outer surface.

17. The inclinometer of claim 16 wherein the distance of the ferrite bead (8) inflexibly attached to said supporting plate (2) from said first axis of rotation is about the same as the distance of the ferrite bead (8) inflexibly attached to said outer surface from said first axis of rotation.

18. The inclinometer of claim 10 wherein at least one said ferrite bead (8) is inflexibly attached to said supporting frame surface.

* * * * *